United States Patent
Chilimbi

(10) Patent No.: US 7,073,032 B2
(45) Date of Patent: Jul. 4, 2006

(54) SYSTEM AND METHOD FOR THE DISCOVERY AND USE REPETITIVELY ACCESSED DATA

(75) Inventor: Trishul Chilimbi, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 32 days.

(21) Appl. No.: 10/891,221

(22) Filed: Jul. 14, 2004

(65) Prior Publication Data
US 2004/0255083 A1      Dec. 16, 2004

Related U.S. Application Data

(63) Continuation of application No. 09/735,027, filed on Dec. 11, 2000, now Pat. No. 6,813,693.

(51) Int. Cl.
*G06F 12/08*      (2006.01)

(52) U.S. Cl. .................. 711/143; 711/137; 711/167
(58) Field of Classification Search ................ 711/137, 711/133, 118, 119, 167, 169, 144, 145, 143; 709/213, 219
See application file for complete search history.

(56) References Cited

U.S. PATENT DOCUMENTS

| | | | |
|---|---|---|---|
| 5,623,608 A * | 4/1997 | Ng .............................. | 711/137 |
| 5,761,718 A * | 6/1998 | Lin et al. .................... | 711/137 |
| 6,098,064 A * | 8/2000 | Pirolli et al. ................... | 707/2 |
| 6,098,154 A * | 8/2000 | Lopez-Aguado et al. ... | 711/137 |
| 6,170,044 B1 * | 1/2001 | McLaughlin et al. ....... | 711/162 |
| 6,216,200 B1 * | 4/2001 | Yeager ....................... | 711/100 |
| 6,282,542 B1 * | 8/2001 | Carneal et al. ............. | 709/219 |

OTHER PUBLICATIONS

Joon-Seo Yim et al, "Single Cycle Access Cache for the Misaligned Data and Instruction Prefetch", IEEE, pp. 677-678, 1997.*

* cited by examiner

*Primary Examiner*—Pierre-Michel Bataille
(74) *Attorney, Agent, or Firm*—Merchant & Gould P.C.; Timothy P. Sullivan

(57) ABSTRACT

A system and method for analyzing data accesses to determine data accessing patterns is provided. Data address accesses are traced and transformed into Whole Program Data Accesses (WPDAs). WPDAs may then be used to discover higher-level data abstractions, such as hot data blocks. Hot data blocks provide information related to sequences of data addresses that are repeatedly accessed together. Hot data blocks may then be used to improve program performance.

16 Claims, 10 Drawing Sheets

SYSTEM AND METHOD FOR THE DISCOVERY AND USE REPETITIVELY ACCESSED DATA

RELATED APPLICATIONS

This application is a continuation of application Ser. No. 09/735,027, filed Dec. 11, 2000, now U.S. Pat. No. 6,813,693 which application is incorporated herein by reference.

FIELD OF THE INVENTION

The present invention relates generally to computer-executable software applications and, more particularly, to improving the performance of computer-executable software applications.

BACKGROUND

As processor speeds continue to increase, memories providing data to the processor have become more and more of a bottleneck. In an effort to speed memory access, high speed caches were created to deliver data to processors. Generally, a cache only stores a fraction of the data stored in main memory. A cache "hit" occurs when the cache contains data the processor is requesting. A cache "miss" occurs when the cache does not contain data the processor is requesting. When a cache miss occurs, the data must be retrieved from main memory or disk. The time to fetch the data when a cache miss occurs, even from main memory, can be much greater than when a cache hit occurs. Increasing the percentage of cache hits and decreasing the number of cache misses, therefore, increases the overall performance of a computer system.

SUMMARY

The present invention provides a system and method for analyzing data access sequences of computer-executable software programs to determine data accessing patterns. Data address accesses of a software program are traced and compiled into Whole Program Data Accesses (WPDAs). The WPDAs are small compared to the raw data address traces and permit analysis without decompression. The WPDAs can then be used to efficiently discover higher-level data abstractions, such as hot data blocks. Hot data blocks may be viewed as frequently repeated sequences of consecutive data accesses. They serve as an effective abstraction for understanding and analyzing a program's dynamic data access behavior as well as exposing reference locality in a data address stream.

In one aspect, hot data blocks are used to perform memory layout optimizations dynamically by collocating in memory data that is frequently accessed sequentially. For example, data is often structured such that one data element is associated with another data element. An array of indexes, for example, may index an array of employee records. A program may retrieve an index and then retrieve the employee record associated with the index. By collocating the index array and the employee array, a memory allocator could, for example, place information such that an index and an employee record are located close to each other. By grouping data in this way, the memory allocator can increase cache hits and/or decrease the time needed to access the data.

In another aspect, hot data blocks are used to provide feedback to programmers. A software developer may see, for example, a frequently repeated pattern of data accesses. Based on this information, the software developer may make design and coding changes to group the data frequently accessed such that cache hits increase and/or memory performance improves.

In another aspect, hot data blocks are used during program execution by a pre-fetching mechanism. Based on the temporal data access information available from the WPDAs, the pre-fetching mechanism more effectively pre-fetches data to overcome certain access latencies which make some pre-fetches less helpful to the processor.

There are several advantages to the present invention. For example, it does not rely on system architecture to provide useful information. In other words, the invention can be practiced on various types of computers and operating systems, including personal computers, hand-held devices, multiprocessor systems, microprocessor-based or programmable consumer electronics, network PCs, minicomputers, mainframe computers, and the like. Embodiments of the invention are used to increase cache hits and memory performance with static tools such as compilers or dynamically as a program executes. The invention provides an efficient and useful way to represent large, hard to manage data access traces that would otherwise occupy gigabytes of storage.

DETAILED DESCRIPTION

Figure 1:
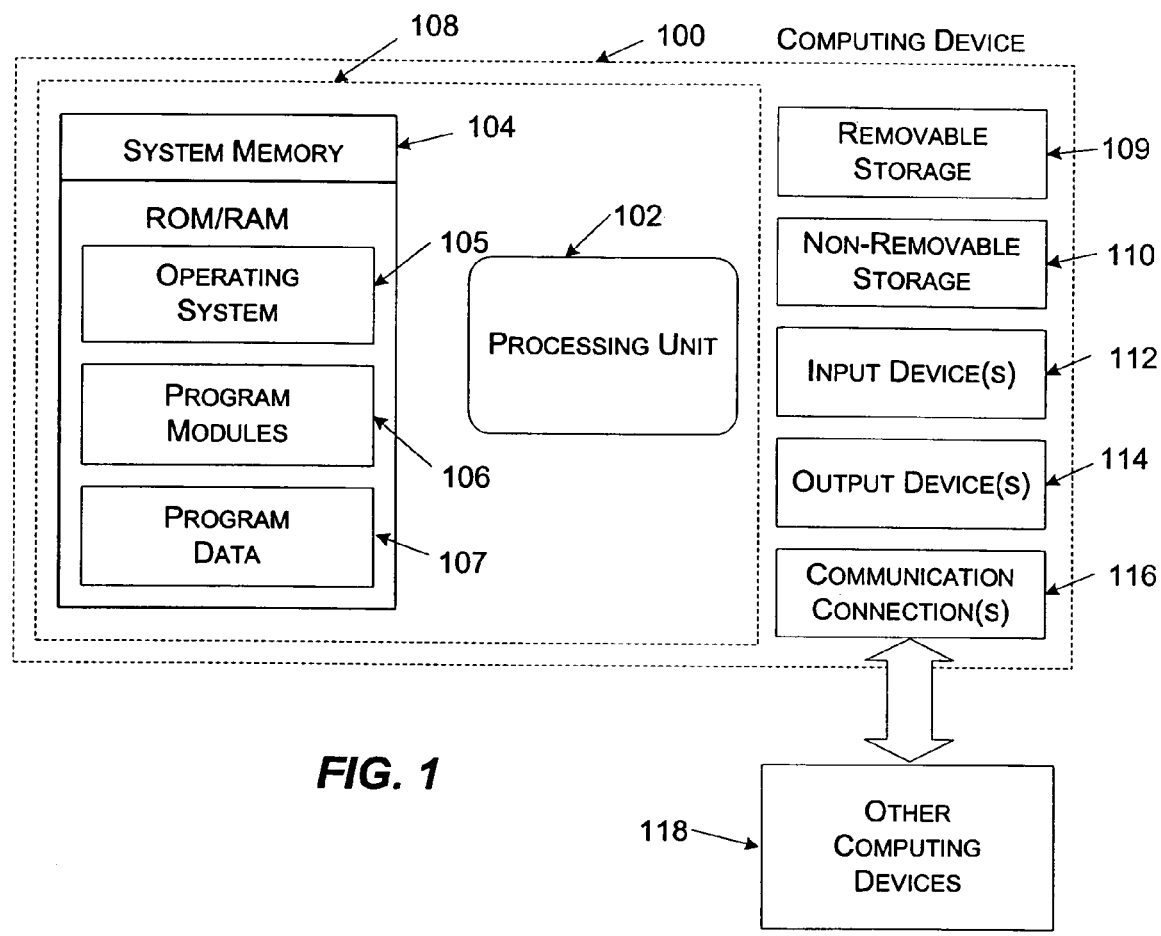
FIG. 1 is a functional block diagram of one computing device adapted to implement one embodiment of the invention.

With reference to FIG. 1, an exemplary system for implementing the invention includes a computing device, such as computing device 100. In its most basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more program modules 106, and may include program data 107. This basic configuration is illustrated in FIG. 1 by those components within dashed line 108.

Computing device 100 may also have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. All these devices are known in the art and need not be discussed at length here.

Computing device 100 may also contain communications connection(s) 116 that allow the device to communicate with other computing devices 118, such as over a network. Communications connection(s) 116 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
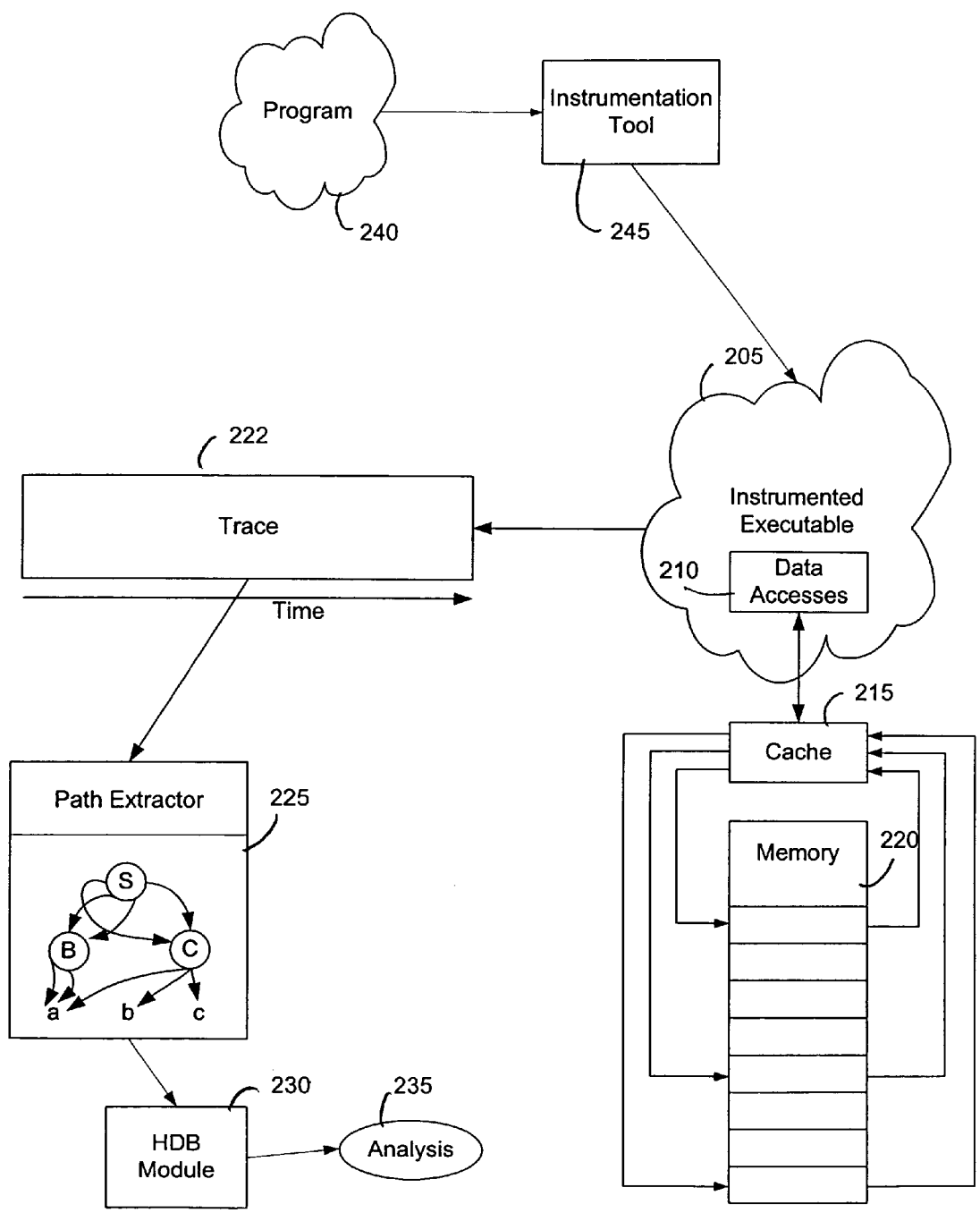
FIG. 2 is a functional block diagram illustrating a system adapted to collect information about the data accesses of an executable program, according to another embodiment of the invention.

FIG. 2 is a functional block diagram illustrating a system adapted to collect information about the data accesses of an executable program, according to one embodiment of the invention. Program 240 includes a computer-executable program. It may include source code or binary code suitable for execution on a computer.

Instrumentation tool 245 is configured to receive the instructions of program 240 and instrument program 240 based on the instructions received. Instrumentation tool 245 may be located on the same computer as program 240, or it may be located on a computer networked to the computer containing program 240. If instrumentation tool 245 is on the same computer as program 240, instrumentation tool 240 may be configured to read the instructions of program 240 from RAM, disk, or some other computer-readable memory accessible by the computer on which instrumentation tool 245 resides.

Instrumentation tool 245 may instrument program 240 before, during, or after compilation. In one embodiment, before compilation, instrumentation tool 245 adds source code to program 240 to output trace information as program 240 executes particular instructions.

In another embodiment, instrumentation tool 245 instruments program 240 during compilation. Instrumentation tool 245 may be included in a compiler compiling program 240. At appropriate points, the compiler calls instrumentation tool 245 to insert instrumenting code in the binary executable the compiler is creating from program 240. Alternatively, instrumentation tool 245 may be a separate program called by the compiler as the compiler compiles program 240. In light of this disclosure, those skilled in the art will recognize that instrumentation tool 245 could be used with a compiler in many different ways to instrument program 240 during compilation without departing from the spirit and scope of this invention.

In yet another embodiment, instrumentation tool 245 instruments a binary executable of program 240. In this embodiment, instrumentation tool 245 inserts code into the binary executable to outputs trace information while the binary executes.

Program 240 may be written for an interpreter to execute. Generally, interpreters do not require a binary in order to execute the instructions of a program. In one embodiment, instrumentation tool 245 instruments program 240 by adding instrumenting code before an interpreter executes program 240.

In another embodiment, the interpreter executing program 240 is modified to include instrumentation tool 245 such that instrumentation tool is called when program 240 executes particular instructions. Then instrumentation tool 245 outputs trace information related to the instructions. In other words, program 240 would not need code added to produce a trace. Instead, the interpreter recognizes instructions that instrumentation tool 245 traces and calls instrumentation tool 245 when these instructions are executed.

When code is instrumented, predefined actions occur upon particular program behavior. For example, program 240 may be instrumented to write data to a data file whenever certain memory is written to or read from. As another example, program 240 may be instrumented to produce a trace of instructions executed. In the embodiment of the invention shown in FIG. 2, program 240 is instrumented to generate a trace relating to data accesses performed by program 240.

The result of inserting instrumenting code into program 240 is an instrumented executable, such as instrumented executable 205. Whenever data is accessed by data accesses 210, the instrumentation code within instrumented executable 205 generates trace information to be stored by trace component 222. Alternatively, in the case of some interpreted code, the result is an interpreter modified to execute program 240 and generate trace information as if program 240 had been instrumented.

Data accesses 210 within instrumented executable 205 send data requests to and from cache 215. Cache 215 provides high speed access to data that has been retrieved or written to previously. Generally, a cache is smaller than main memory 220, so typically, cache 215, even when fully utilized, only contains a fraction of memory 220. A request for data that is not in cache 215 causes a request to be sent to memory 220 for the data. When memory 220 responds with the data, the data is returned to the requesting entity and stored in cache 215. As long as new data does not overwrite the data in cache 215, future requests for the same data are typically fulfilled much quicker than if the data is retrieved from memory 220.

A request for data not contained in cache 215 which is satisfied from memory 220 may take two or more orders of magnitude longer than a data request satisfied from cache 215.

Trace component 222 is illustrated in greater detail in FIG. 3 and described below. Briefly described, trace component 222 is configured to receive trace information and store the trace information for future access. The trace information is stored in memory, on disk, or in other computer readable media. Furthermore, a trace received by trace component 222 may be stored on the same computer system in which instrumented executable 205 executes, or it may be stored on a computer system communicating with the computer system upon which instrumented executable 205 executes.

In one embodiment of the invention, trace component 222 receives trace information from instrumented executable 205. In another embodiment of the invention, trace component 222 receives trace information from another source such as disk, memory, or another computer system. Being able to receive trace information from other sources allows trace component 222 to store previous traces which can then be analyzed. In other words, trace component 222 is not limited to receiving trace information from an executing instrumented executable. As long as the trace information is in a form appropriate for trace component 222 to receive, it does not matter where the trace information comes from.

Path extractor 225 is configured to receive a trace from trace component 222, to transform the trace received into Whole Program Data Accesses (WPDAs), and to send the WPDAs to hot data block module 230. In one embodiment of the invention, path extractor 225 receives the trace after several data accesses have been stored in trace component 222 and then constructs the WPDAs. In another embodiment of the invention, path extractor 225 receives the data accesses as they are generated and constructs the WPDAs while instrumented executable 205 executes. Path extractor 225 forms WPDAs by constructing a context free grammar. The grammar includes rules for generating sequences of data accesses corresponding to the data access sequences in the trace received from trace component 222. The grammar may be represented as a Directed Acyclic Graph (DAG) as shown within path extractor 225.

By transforming the trace received from trace component 222 to WPDAs, path extractor 225 typically reduces the amount of data needed to represent a trace. A trace received by trace component 222 may consume gigabytes of storage, even for a relatively short execution of instrumented executable 205. For example, the inventors have noticed that, in actual use, 252.eon, a SPECint 2000 benchmark, generated a trace of 2.6 gigabytes in 60 seconds of run time. In one actual implementation, path extractor 225 compressed the 252.eon trace to less than 6 megabytes giving a 456 to 1 compression ratio.

In transforming the trace from trace component 222, path extractor 225 may eliminate redundant or unnecessary information to reduce the amount of data to that which is pertinent for analyzing program 240's data access patterns. Path extractor 225, for example, may eliminate stack references. Stack references are typically located closely together in memory. Because of the locality of stack references, data accesses to one element in a stack typically cause other elements in the stack to be retrieved as well. Thus, optimizing sequences of stack references further does not generally yield as much improvement as optimizing other data access sequences. For this reason, and to reduce the size of data to be analyzed, stack references, may be eliminated in the trace received from trace component 222.

Figure 3:
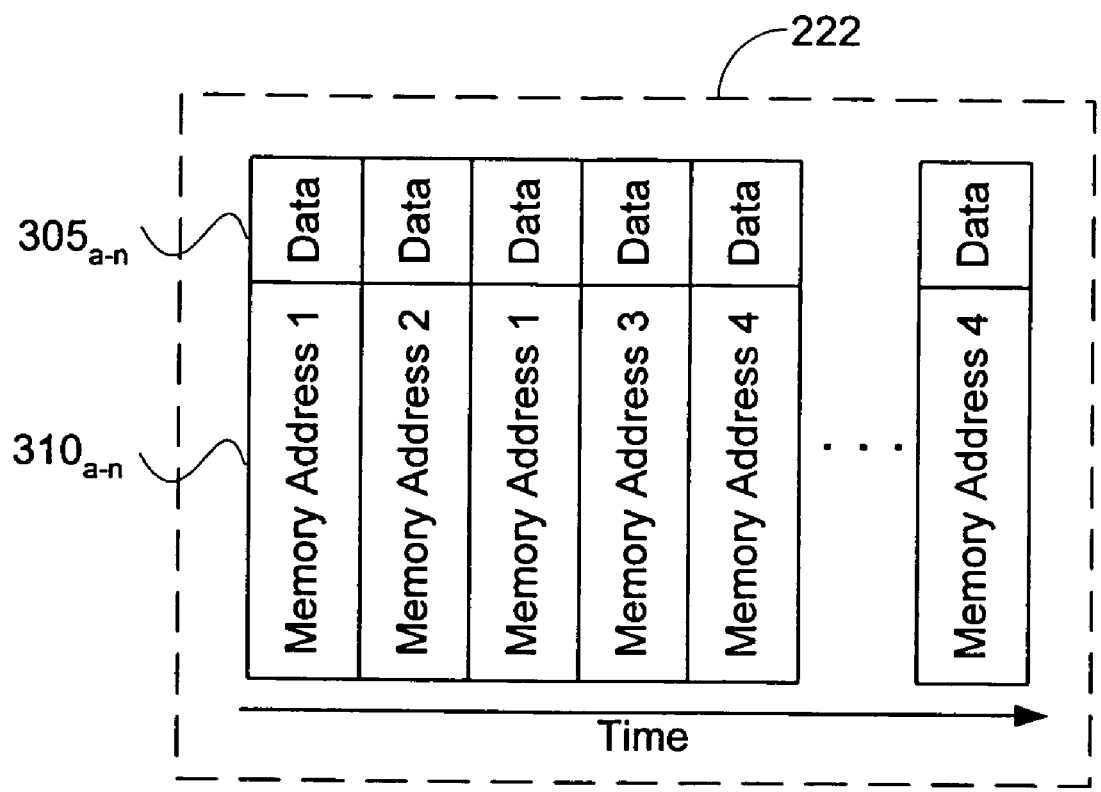
FIG. 3 illustrates a trace file of data accesses, according to one embodiment of the invention.
Figure 7:
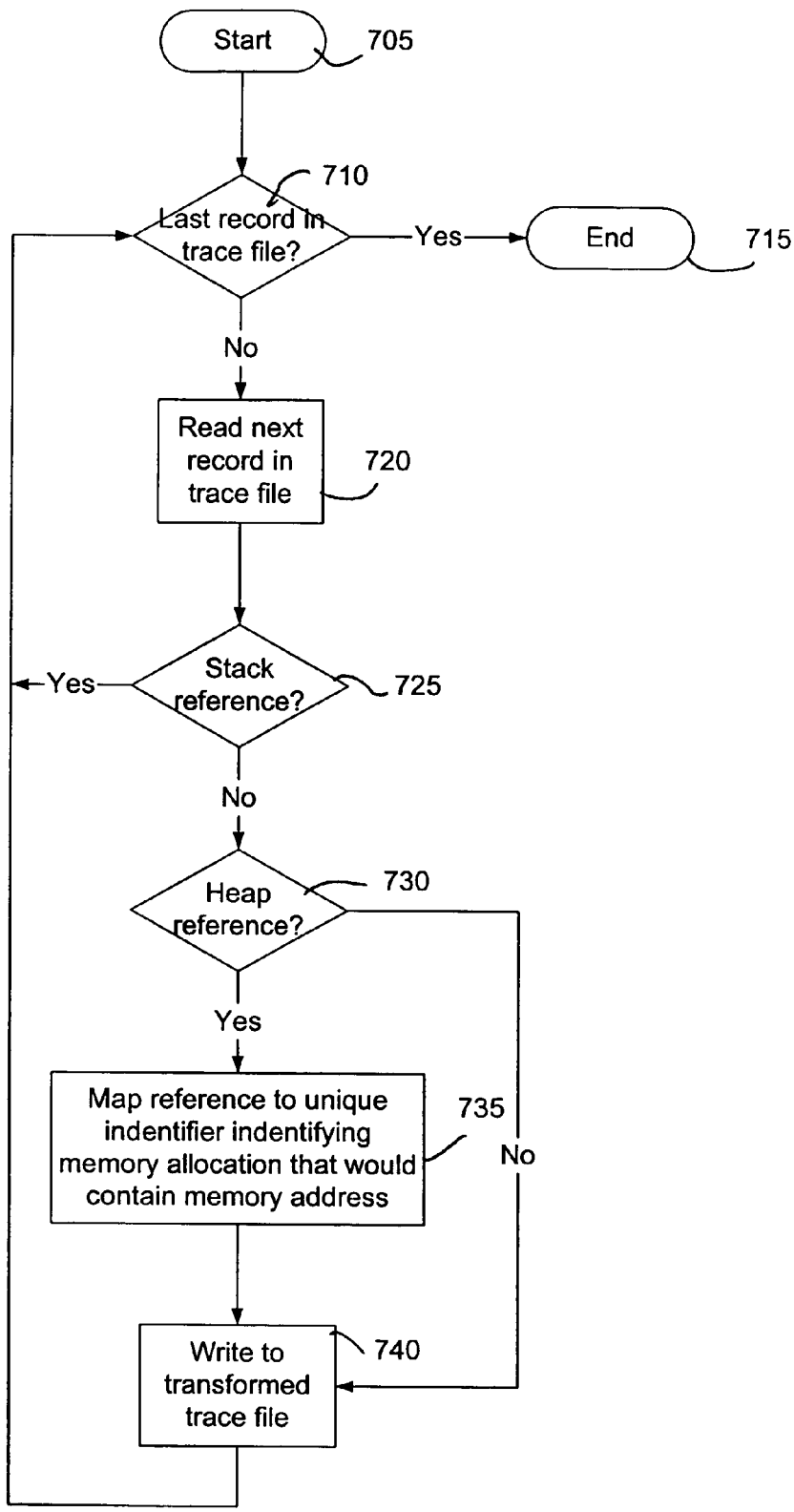
FIG. 7 is a logical flow diagram illustrating a process transforming a data accesses trace file into a more compact form, according to one embodiment of the invention.

In addition, path extractor 225 may transform related data addresses to make the data access sequence easier to analyze, more compressible, and/or for other reasons discussed in conjunction with FIGS. 3 and 7.

Hot data block module 230 is configured to receive the WPDAs from path extractor 225. Hot data block module 230 analyzes the WPDAs to discover hot data blocks. The hot data blocks discovered may then be used for further analysis A hot data block is a frequently repeated sequence of consecutive data references. Stated more formally, a hot data block is a sequence of R or fewer consecutive data references that incur a cost of C or more, where C is formed from the product of the number of references in the data block and the access frequency of that block. For example, a block of consecutive data references that includes only ten references and repeats only once has a lower cost that a block of consecutive data references that includes only two references and repeats six times. Hot data blocks are used to improve cache and memory performance.

FIG. 3 illustrates in greater detail one sample trace stored in trace component 222 of data accesses as illustrated in FIG. 2, according to one embodiment of the invention. The trace stored in trace component 222 includes a sequence of memory addresses $310_{a-n}$ and data elements $305_{a-n}$. In one embodiment of the invention, the sequence is in chronological order. The trace stored in trace component 222 may include less than all data access references a program generates. For example, some data references such as stack references and other data references may not be included in data trace 300. This would happen, for example, if program 240 was instrumented such that it did not output trace information when such a reference occurred.

A trace entry includes at least a memory address $310_{a-n}$ and may also include a data element $305_{a-n}$. Memory address $310_{a-n}$ an may be the actual memory address referenced by a program or it may be a different memory address or identifier related to the memory address accessed by the program. For example, a heap object may be accessed using several different memory addresses. The heap object may include an array of data elements which are each accessed individually. Without mapping such accesses to a unique identifier identifying the heap object, such accesses might appear to be accesses to several different data objects. For this reason and reasons discussed in conjunction with FIG. 7, references to data elements within the same heap object may be mapped to a unique identifier identifying the heap object.

Data elements $305_{a-n}$ may include data such as a time stamp, a program counter value, a reference type, e.g. stack reference, heap reference, global reference, program call stack, etc., an identifier uniquely identifying a heap allocation, information identifying a thread accessing the data, or other information useful for later analysis.

To be able to map different related heap addresses to a unique heap object, it may be necessary to collect information about allocations and deallocations of heap objects. The information may include the allocation/deallocation program counter, the start address of the allocated/freed memory, the size of the allocated/freed memory, a global counter that uniquely identifies a particular allocation/deallocation, the last three functions on the call stack, and other data. In one embodiment of the invention, the information is maintained in an auxiliary trace with indexes to indicate where in the data reference trace the allocations and deallocations occur. In another embodiment of the invention, the information is interleaved with the data addresses in a single trace.

Figure 6:
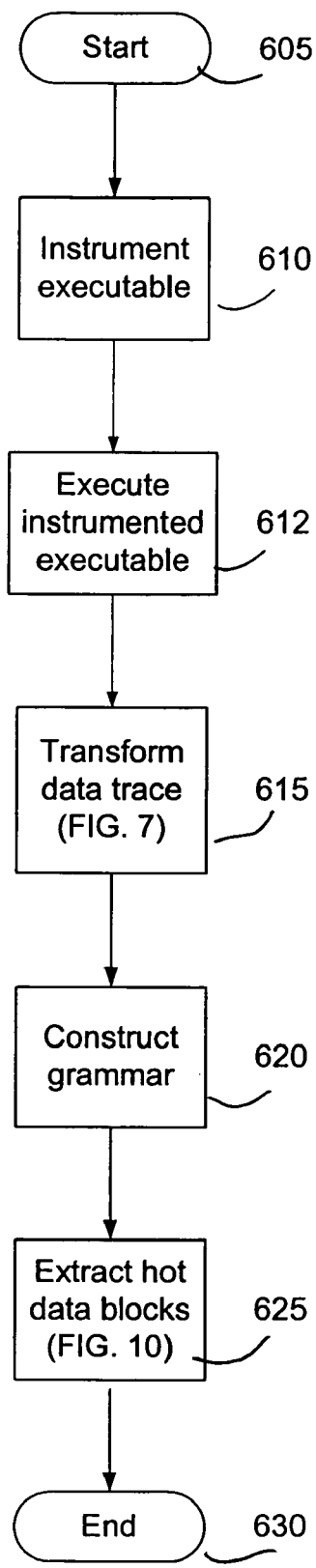
FIG. 6 is a logical flow diagram illustrating a process extracting an executable's data access patterns, according to one embodiment of the invention.

FIG. 6 is a logical flow diagram illustrating a process for discovering repetitively occurring data access patterns in an executable program. The process begins at block 605 when a user desires to discover data access patterns in an executable program. For example, referring to FIG. 2, a user may wish to discover any hot data blocks occurring as a result of executable program 240's data accesses.

At block 610, an executable program is instrumented to output data access information. For example, referring to FIG. 2, instrumentation tool 245 inserts instrumentation code into executable program 240. The instrumentation code is designed to output data accesses performed by the executable program 240. After instrumenting code has been inserted into the executable program, processing continues at block 612.

At block 612, the instrumented executable program is executed. While the instrumented executable program executes, the instrumentation code within the instrumented executable program outputs a data access sequence of the executable program. The data access sequence is stored in a trace in RAM, on disk, or in some other computer-readable media. For example, referring to FIG. 2, as instrumented executable 205 executes, the data access sequences of executable program 240 are stored in trace 222.

At block 615, the trace is transformed to remove unnecessary data access references and to modify other data access references to improve compressibility of the trace. Briefly described, stack references are removed and heap references are modified. This is described in more detail in conjunction with FIG. 7. For example, referring to FIG. 2, path extractor 225 reads trace 222 and modifies heap references and removes stack references.

At block 620, a grammar is constructed representing the transformed trace file. The grammar is also known as WPDAs and represents the data accesses the executable program performs. The grammar may be represented as a directed acyclic graph (DAG). The grammar generates a single string, which is the input sequence of data accesses. The data access trace can be regenerated by traversing the DAG in postorder. The DAG representation of the grammar permits efficient analysis and detection of hot data blocks. For example, referring to FIG. 2, path extractor 225 constructs a grammar from the transformed trace file. An example of a DAG is seen within path extractor 225.

At block 625, the grammar is used to discover hot data blocks. Briefly described, the grammar is examined for patterns of frequently repeated data access sequences. Data sequences frequently repeated are marked as hot if the product of the number of repetitions and the length of the sequence exceeds a selectable threshold. Discovering hot data blocks is described in more detail in conjunction with FIG. 10. For example, referring to FIG. 2, hot data block module 230 uses the grammar constructed by path extractor 225 to discover hot data blocks. After hot data blocks are discovered, processing continues to block 630 and ends.

In another embodiment of the invention, the trace generated at block 612 does not include all data accesses. For example, stack references may not be recorded in the trace file. This could be accomplished by instrumenting the executable program such that no output is generated when the executable program accesses a stack data reference. In this embodiment of the invention, removing stack references at block 615 is not necessary.

In another embodiment of the invention, the heap references in the trace generated at block 612 are transformed to a more compressible state before the process reaches block 615. This could be accomplished by instrumenting the executable program such that heap references are transformed as described in more detail in conjunction with FIG. 10. In this embodiment of the invention, transforming heap references at block 615 is not necessary.

Figure 10:
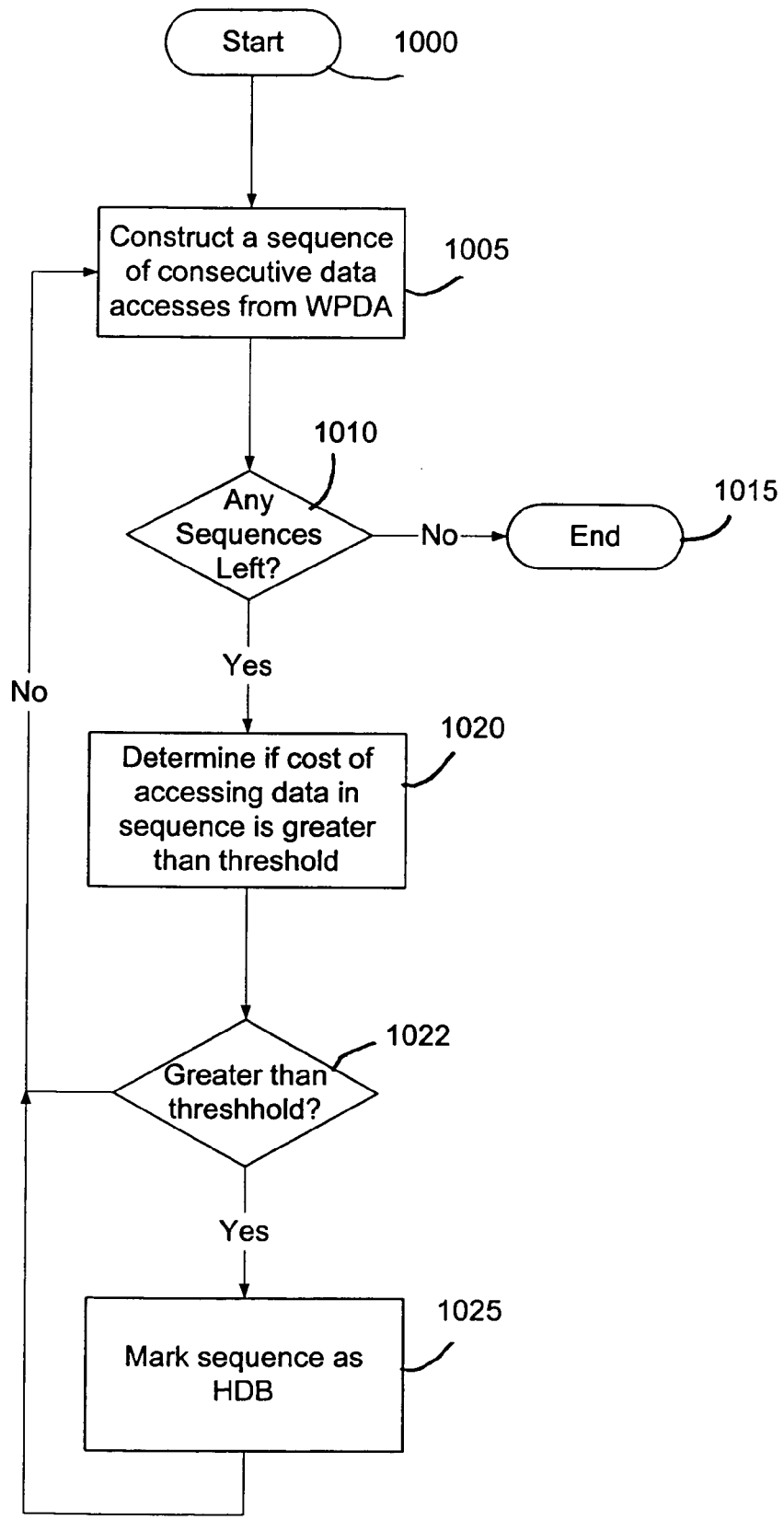
FIG. 10 is a logical flow diagram illustrating a process for discovering hot data blocks, according to one embodiment of the invention.

In another embodiment of the invention, trace module 610 instruments the executable such that stack references are omitted from the trace file and heap references are transformed in a manner similar to that described in conjunction with FIG. 10. This could be accomplished by instrumenting the executable appropriately. In this embodiment of the invention, block 615 is not necessary and processing flows directly from block 612 to block 620.

An algorithm that is used to implement block 620 according to one embodiment of the invention is the SEQUITUR algorithm. For information regarding the SEQUITUR algorithm, see C. F. Nevill-Manning and I. H. Witten, "Compression and explanation using hierarchal grammars," The Computer Journal, vol. 40, pp. 103–116, 1997. Another algorithm used to implement block 620 according to another embodiment of the invention is a modification of the SEQUITUR by James R. Larus. For this modification, see James R. Larus, "Whole program paths," Proceedings of the ACM SIGPLAN'99 Conference on Programming Language Design and Implementation, pp. 259–269, May 1999. Other hierarchical grammar construction algorithms may be used to implement grammar construction module 620 in other embodiments of the invention.

FIG. 7 is a logical flow diagram generally illustrating a process for transforming a data accesses trace file into a more compact form, according to one embodiment of the invention. The process begins at block 705 after a trace is available for transformation.

At decision block 710, if there are no more records to be processed in the trace file, the yes branch is followed and the process terminates in end block 715. If there are more records in the trace file, processing continues at block 720.

At block 720, a record is read from the trace file. In one embodiment of the invention, the next record in the trace file is read from disk. In another embodiment of the invention, the next record is read directly from memory. In yet another embodiment of the invention, the next data access record is obtained from a program that is currently executing.

At decision block 725, a determination is made as to whether the next record in the trace file is a stack reference or not. If the next record in the trace file is a stack reference, processing continues at block 710. If the next record in the trace file is not a stack reference, processing continues at block 730.

At decision block 730, a determination is made whether the next record in the trace file is a heap reference. If the record in the trace file is a heap reference, processing continues at block 735. If the record in the trace file is not a heap reference, processing continues at block 740.

At block 735, a heap reference is mapped to a unique identifier identifying the memory allocation containing the memory address of the heap reference. For example, a program may request a block of memory from the heap during program execution. Such a memory request might be used for an array of data elements. Subsequently, the program may use the array for various operations and calculations. At block 735, each data access reference to the array is mapped to a single identifier identifying the memory block.

Mapping each data access to data within a block to the same identifier has several advantages. One advantage is that it greatly increases the compressibility of the data access pattern. This occurs because a series of accesses to data within the memory block is no longer treated as a series of accesses to multiple addresses; rather, it is treated as a series of accesses to a single identifier. This makes the data access sequence more repetitive. Typically, the more repetitive a sequence is, the more compressible it is.

Another advantage to mapping each data access to data within a block to the same identifier is that it simplifies analysis of a data access sequence. Specifically, instead of analyzing the sequence within the block, an analyzer can focus on a sequence of blocks accessed. Typically, information about the sequence of blocks accessed is more important to improving cache and memory performance than information about the sequence of memory addresses accessed within a block. This is true because generally a memory block allocation allocates contiguous memory. Data located in contiguous memory is typically placed on the same memory page or on contiguous memory pages. Because many memory managers retrieve and flush pages of memory to disk in one operation, access to a data element within a block typically causes all or a substantial portion of the data in the block to be retrieved into main memory at one time. Consequently, other accesses to data in the block typically incur no extra retrieval time.

Accesses to data elements in different blocks, on the other hand, often do cause extra retrieval time. This occurs because blocks obtained by memory allocations are typically scattered in memory or on disk. While accessing a data element in one block often causes the rest of the block to be retrieved into memory, accessing a data element in one block does not typically cause the next needed data block to be retrieved into memory. But a memory manager aware of sequences of data blocks that will be requested or allocated by a program could place the data blocks in close proximity and possibly on the same memory page. Alternatively, it could pre-fetch pages containing data blocks soon to be accessed as described in conjunction with FIG. 5.

By mapping each reference to a memory address in a block of memory to a unique identifier, some information is lost. Specifically, rebuilding the exact data access sequence from the mapped representation is no longer possible. However, as stated above, being able to rebuild the exact data access sequence within a block is not necessary to improving memory and cache performance.

At block 740, transformed data is written to a transformed trace file. The transformed trace file may be in RAM or on some other memory device including disk. The transformed trace file is used for finding hot data blocks.

After block 740, processing returns to block 710 to determine if there are any more records in the trace file to be transformed, and the process may repeat until no more records remain.

FIG. 10 is a logical flow diagram illustrating a process for determining hot data blocks, according to one embodiment of the invention. The process begins at block 1000 after a WPDAs pattern has been compiled.

At block 1005, a sequence of consecutive data accesses is constructed from the WPDAs. In one embodiment of the invention, the sequence is constructed by postorder traversal of the DAG representing the WPDAs, where each node is visited once. In this embodiment, at each interior node, the consecutive data access sequences are constructed by concatenating data access sequences in subblocks produced by two or more of the node's descendants.

In another embodiment of the invention, at block 1005, construction of a sequence starts with the small sequence of data accesses that has not already been determined to be a hot data block. Addition of sequences to the beginning or end of the sequence continues until the sequence constitutes a hot data block. In this way, minimal hot data blocks are constructed. A minimal hot data block is a sequence of data accesses which incurs a cost greater than or equal to C, but incurs a cost less than C when any part of the sequence is removed from the beginning or end of the data accesses sequence. C is the threshold cost a data access sequence must incur to be considered a hot data block. Minimal hot data blocks are useful since all non-minimal hot data blocks are formed by adding a data access sequence to the beginning or end of a minimal hot data block data access sequence.

At decision block 1010, the existence of a sequence is tested. If no sequence was constructed, the no branch is followed to end block 1015, where the process ends. If a sequence was constructed, the yes branch is followed to block 1020.

At block 1020, a determination is made as to whether the cost of accessing data in the sequence is greater than a threshold. Cost is the product of the number of references in the data sequence multiplied by the number of times the data access sequence is repeated. Preferably, the threshold may be set such that the hot data blocks resulting cover 90% of the data accesses of the entire trace. Setting such a threshold is often an iterative process because one generally does not know how low or high to set the threshold to cover 90% of the data accesses without experimentation.

At block 1022, a determination is made as to whether the cost of accessing the sequence is greater than the threshold. If the cost is not greater than the threshold, processing continues at block 1005. If the cost is greater than the threshold, processing continues at block 1025.

At block 1025, the data access sequence is marked as being a hot data block. Then process flow returns to at block 1005, until no sequences remain at decision block 1010. At that point, hot data blocks in the DAG are identified and can be used for further analysis or program optimization.

The previous discussion relates to the discovery of hot data blocks. The discussion below relates to the use of hot data blocks to increase program performance.

Figure 4:
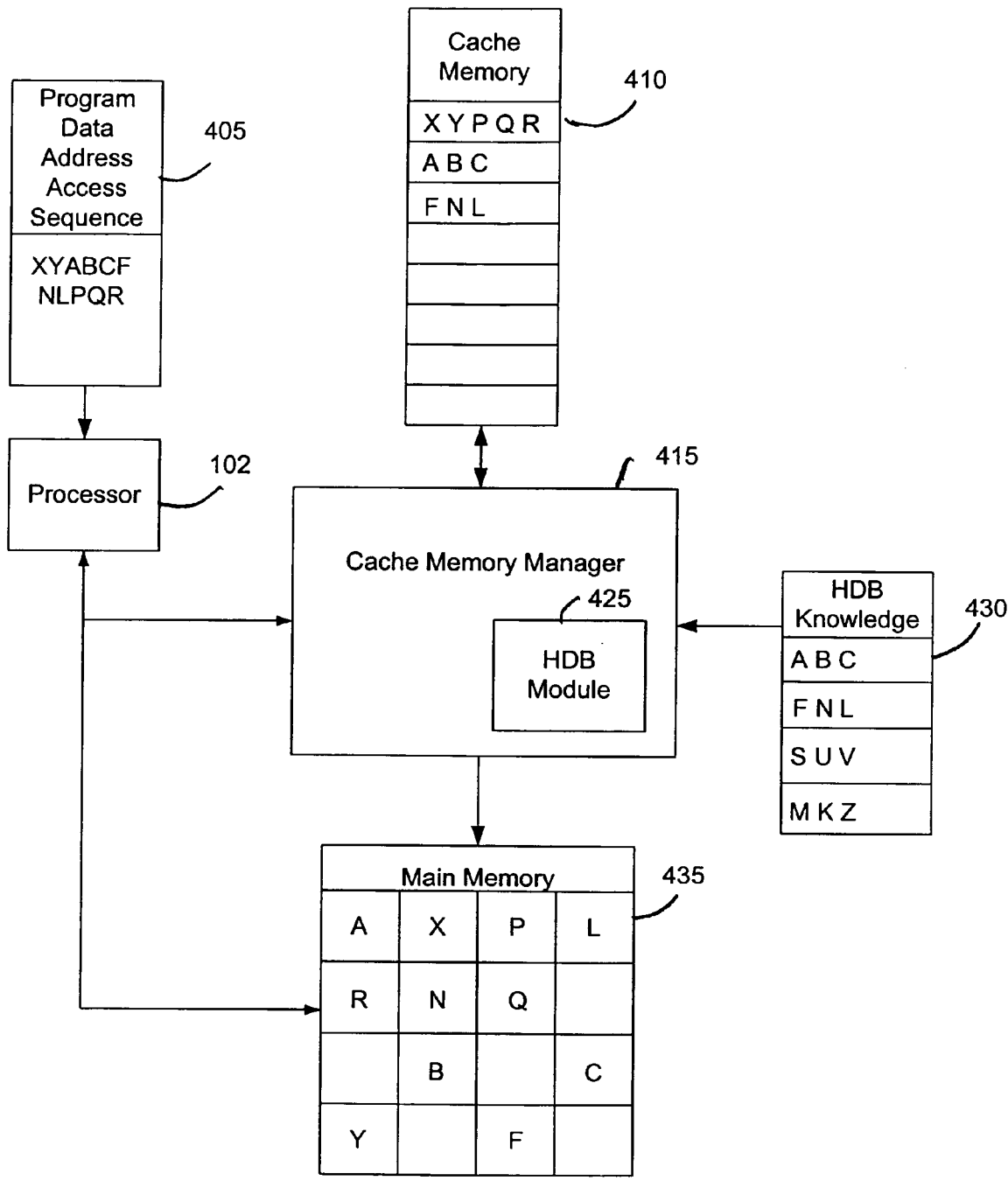
FIG. 4 is a functional block diagram illustrating a system adapted to use hot data block knowledge to improve program performance, according to another embodiment of the invention.

FIG. 4 is a functional block diagram illustrating a system adapted to use hot data block knowledge to improve program performance, according to one embodiment of the invention. Program data address access sequence 405 includes a sequence of data addresses requested by a program. Processor 102 receives these requests and makes demands of cache memory 425 and main memory 435. Processor 102 operates as described in conjunction with FIG. 1. Cache memory manager 415 may include a hot data block module 425 which uses information from a hot data block knowledge store 430 to arrange cache data. Hot data block store 430 contains information regarding hot data blocks used in the program. Main memory 435 operates similarly to memory 220 as described in conjunction with FIG. 2.

Cache memory manager 415 is configured to place data from data requests from processor 102 in such a way as to increase program performance. One way of doing this is to place such data into cache memory such that future requests for the data are more likely to return quickly. In one example, X, Y, P, Q, and R are not shown in any hot data blocks of hot data knowledge store 430. Consequently, when data requests for these data items are sent from processor 102 to cache memory manager 415, data from these requests is placed in cache memory without concern for future reference to the items. Data access sequences ABC and FML, however, are contained in hot data block knowledge store 430. When cache memory manager 415 receives requests for these data elements, it arranges the data in cache memory to improve future accesses to these data elements.

While not shown in FIG. 4, hot data block knowledge store 430 may also be used in allocating main memory to increase program performance. For example, by placing hot data block data sequences in the same locale, a memory manager may speed access to future data accesses. For example, when a memory manager recognizes data belonging to a hot data block sequence, it could place such data together on a memory page so that future accesses to the data elements in a hot data block would cause one memory page to be accessed rather than causing several memory pages to be accessed. This is useful, for example, when, as often happens, memory pages are swapped to and from disk. Swapping two or three memory pages instead of one may take significantly longer than swapping just the one memory page. As swapping to disk is a costly procedure in terms of CPU time, reducing disk swaps improves program performance.

While cache memory 410 is shown having hot data block sequences ABC and FML together, this does not necessarily mean that they are together in cache memory. It simply means that given cache memory 410's characteristics, these data elements are placed in such a way in cache memory 410 that data accesses to these data elements are performed more quickly. For example, some placements of these data elements could cause a cache conflict such that data access performance was not increased in the placement.

Hot data block knowledge store 430 shows four separate hot data block sequences. However there may be many more or fewer hot data block sequences than shown in hot data block knowledge store 430. Furthermore, the hot data block sequences may be of greater length or lesser length or any variety of lengths without departing from the spirit and scope of this invention.

Figure 5:
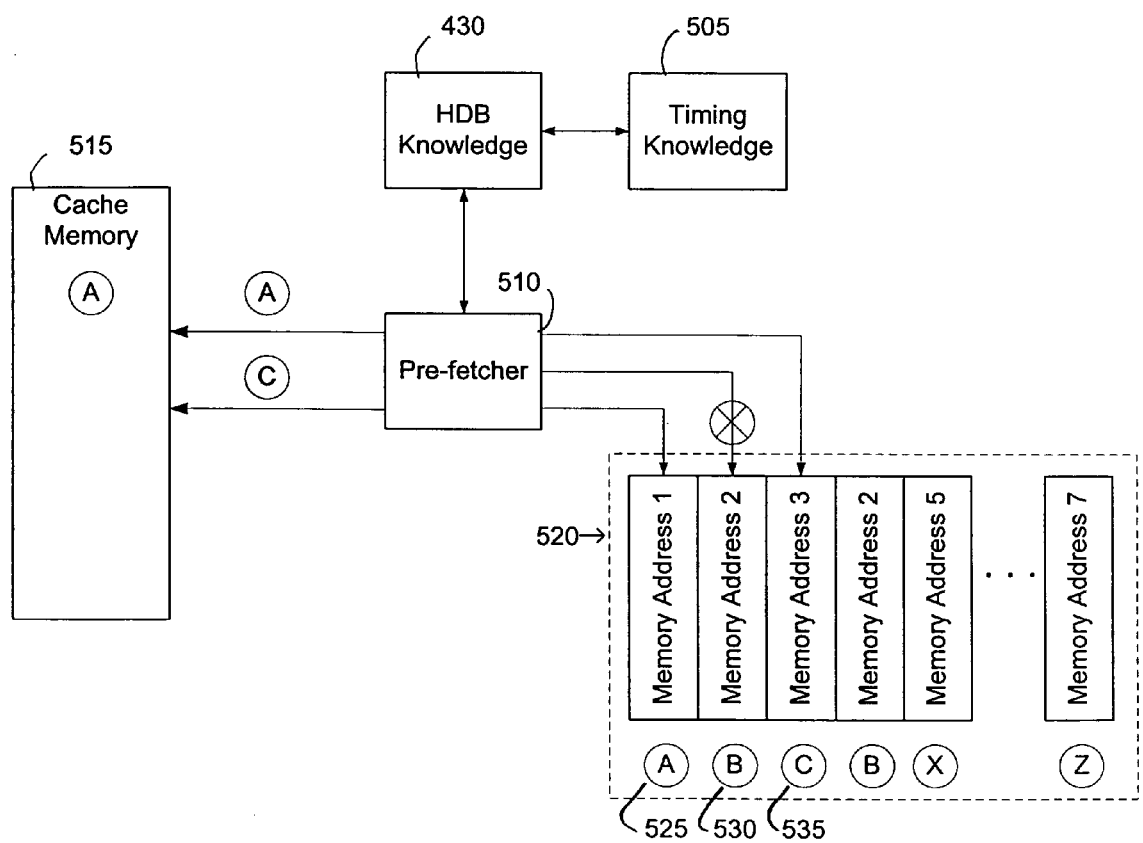
FIG. 5 is a functional block diagram illustrating a pre-fetching mechanism interacting with hot data block knowledge and other components to speed program execution, according to one embodiment of the invention.

FIG. 5 is a functional block diagram illustrating a pre-fetching mechanism interacting with hot data block knowledge and other components to speed program execution, according to one embodiment of the invention. Pre-fetcher 510 uses information from hot data block knowledge store 430 and timing knowledge 505 to pre-fetch data from data access sequence 520 into cache memory 515. Hot data block knowledge store 430 operates as described in detail in conjunction with FIG. 4.

Timing knowledge 505 contains information regarding how long pre-fetcher 510 has to retrieve a data element before it is needed by a program. Through appropriate use of timing knowledge 505, pre-fetcher 510 is able to determine which data from data access sequence 520 can be fetched in time for the program. In the embodiment shown in FIG. 5, pre-fetcher 510 has recognized a hot data block sequence including element A 525, element B 530, and element C 535. Using timing knowledge 505, pre-fetcher 510 determines that data element B 530 cannot be fetched quickly enough for use by the program and also determines, however, that data element C 535 can be fetched quick enough so that it is available for use when the program needs it. Therefore, pre-fetcher 510 foregoes pre-fetching data element B 530 and starts pre-fetching data element C 535 for use by the program.

In one embodiment, pre-fetcher 510 is configured to fetch data elements that will arrive in time for use in the program as quickly as possible. In another embodiment, pre-fetcher 510 is configured to delay fetching data elements that can be fetched in time for use in the program until a predetermined time before the program needs the data element. Although FIG. 5 shows pre-fetcher fetching data elements from data access sequence 520 into a cache memory 515, in another embodiment, pre-fetcher 510 fetches data elements from data access sequence 520 into RAM. By doing this, pre-fetcher 510 is able to avoid or reduce latencies associated with retrieving the data from disk or other slow memory.

Figure 8:
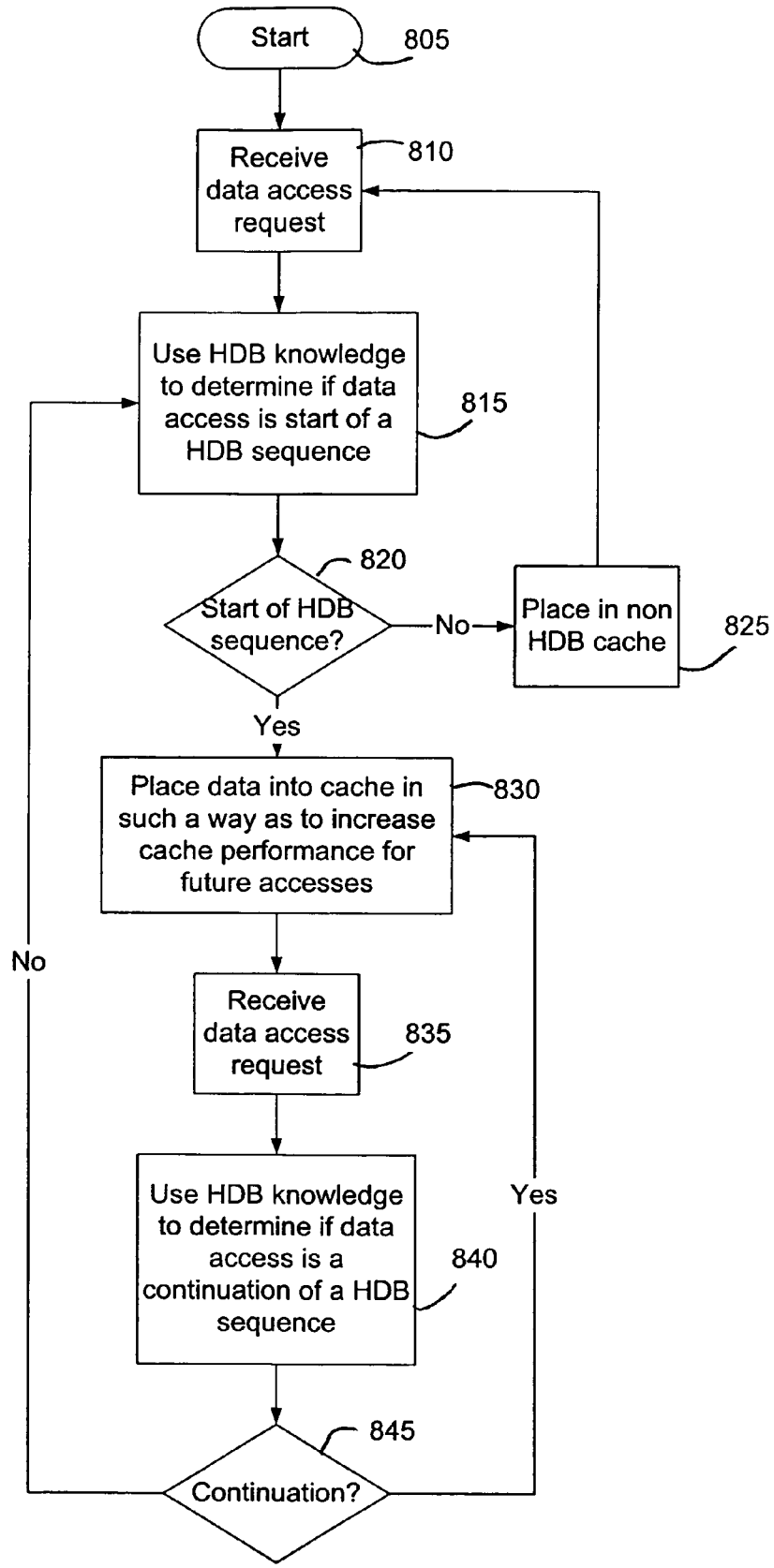
FIG. 8 is a logical flow diagram illustrating a process dynamically increasing program performance using hot data block knowledge, according to another embodiment of the invention.

FIG. 8 is a logical flow diagram illustrating a process for dynamically increasing program performance by using hot data block knowledge, according to one embodiment of the invention. The process begins at block 805 after some hot data block information is available for use.

At block 810, a data access request is received. The data access request could come from a CPU, another computer, or some other data accessing device. For example, referring to FIG. 4, processor 102 could request data element X from cache memory manager 415 and main memory 435.

At block 815, hot data block knowledge is searched to determine if the data access "appears" to be the start of a hot data block sequence. The word "appears" is used because a hot data block sequence may or may not follow a data access request for the first element in the hot data block. For example, a data access to a specified memory location will in some instances be followed by other data accesses as indicated by a hot data block. In other instances, however, a data access for an element that appears to be the start of a hot data block access sequence may not be followed by other data accesses in the hot data block sequence. For example, referring to FIG. 4, cache memory manager 415 searches hot data block knowledge 430 to determine if X is the start of a hot data block.

At block 820, if the search performed at block 815 finds that the data access appears to be the start of a hot data block, processing flows to block 830. Otherwise processing flows to block 825. For example, referring to FIG. 4, cache memory manager 415 may find that X is not the start of a hot data block in hot data block knowledge 430.

At block 825, the data from the data access request is placed in cache memory. Many different caching schemes may be used to place this data. For example, data from all non hot data block data accesses may be placed in limited portions of the cache. This may cause these limited portions of cache to be overwritten frequently, but this may be a desired result because these limited portions of cache represent accesses to non hot data blocks and do not need to be optimized as much as the data accesses to hot data blocks. For example, referring to FIG. 4, cache memory manager 415 retrieves X from main memory 435 and places X in a non hot data block portion of cache memory 410.

At block 830, data is placed into cache memory to increase cache performance for future accesses. As described previously in conjunction with FIG. 4, this does not necessarily mean that all data in a hot data block sequence will be located contiguously in cache memory. To avoid cache conflicts, for example, data from data accesses may be placed appropriately in cache memory. For example, referring to FIG. 4, cache memory manager 415 places a memory access to data element A (the start of a hot data block) into cache memory 410 in such a way to increase future cache performance for future references to data element A.

At block 835, a data access request is received similarly to that found at block 810. For example, referring to FIG. 4, cache memory manager 415 receives a data access request for data element B from processor 102.

At block 840, hot data block knowledge is searched to determine if the data access request received is a continuation of a hot data block sequence. For example, referring to FIG. 4, cache memory manager 415 uses information from hot data block knowledge 430 to determine if data element B following data element A is a continuation of a hot data block sequence.

At block 845, the result of processing at block 840 is used to determine where process flow should continue. If the data access is not a continuation of a hot data block sequence, processing continues at block 815. If the data access is a continuation of a hot data block sequence, processing continues at block 830.

In another embodiment of the invention, the logic and modules in FIG. 8 work in conjunction with main memory in addition to or in lieu of cache memory. Specifically, when data accesses are determined to be in a hot data block sequence, data from the data accesses is placed in pages of memory such that a retrieval of a earlier data element causes subsequent data elements of the hot data block sequence to be retrieved since they reside on the same page, thus potentially reducing disk swapping as previously mentioned.

In yet another embodiment of the invention, a garbage collector uses the hot data block information to improve placement of data during a copying phase. Specifically, during copying, the garbage collector collocates in memory data elements in the same hot data block so that the data elements are more likely to be placed in the same cache block.

Figure 9:
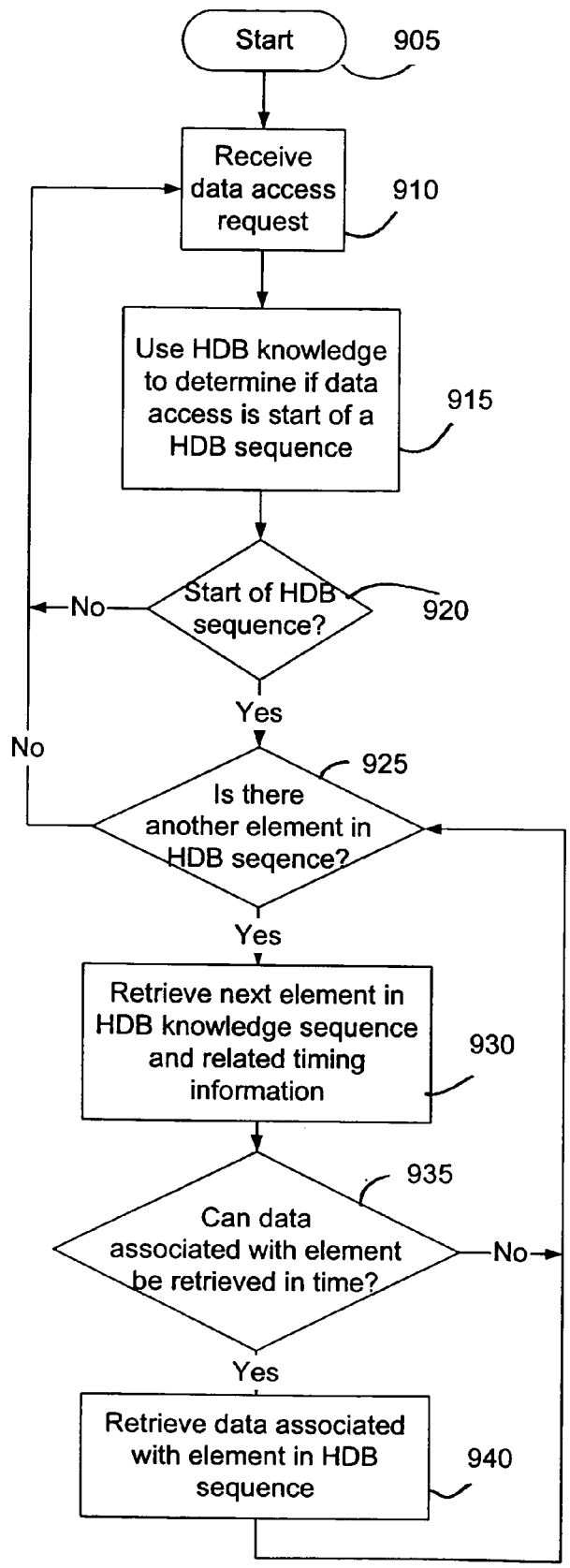
FIG. 9 is a logical flow diagram illustrating a process dynamically increasing program performance by pre-fetching data based on data access knowledge, according to one embodiment of the invention.

FIG. 9 is a logical flow diagram illustrating a process for dynamically increasing program performance by pre-fetching data based on data access knowledge, according to one embodiment of the invention. The process begins at block 905.

At block 910, a data access request is received. The data access request could come from a CPU, another computer, or some other data accessing device.

At block 915, hot data block knowledge is searched to determine if the data access appears to be the start of a hot data block sequence as described in more detail in conjunction with block 815 of FIG. 8. For example, referring to FIG. 5, pre-fetcher 510 uses hot data block knowledge store 430 to determine if data element A appears to be the start of a hot data block.

At block 920, a decision is made. If the data access appears to be the start of a hot data block, processing flows to block 925. Otherwise processing flows to block 810. For example, referring to FIG. 5, hot data block knowledge store 430 contains a sequence (not shown) of ABC. Data access element A appears to be the start of a hot data block.

At block 925, a determination is made as to whether there are more data elements in the hot data block sequence found at block 815. If there are more data elements, processing continues at block 930. If there are not any more elements, processing continues at block 810. For example, referring to FIG. 5, hot data block knowledge store contains two more data elements, B and C (not shown), for the hot data block starting with data element A.

At block 930, the next element in the hot data block sequence is retrieved. Additionally, timing information is also retrieved relating to how long it takes for the data element in the hot data block sequence to be retrieved. For example, referring to FIG. 5, pre-fetcher 510 retrieves the next data element in the hot data block sequence from hot data block knowledge store 430. Then, pre-fetcher 510 retrieves timing information related to the next data element from timing knowledge store 505.

At block 935, the timing information is used to determine if the data element can be retrieved in time for use. If the data element cannot be retrieved in time for use, processing continues at block 925. If it can be retrieved in time for use, processing continues at block 940. For example, referring to FIG. 5, pre-fetcher 510 determines that data element B cannot be retrieved in time for use.

At block 940, a data element that can be retrieved in time for use is retrieved. For example, referring to FIG. 5, pre-fetcher 510 finds that data element C can be retrieved in time and starts retrieving it. This causes data element C to be in memory when it is needed.

The various embodiments of the invention are implemented as a sequence of computer implemented steps or program modules running on a computing system and/or as interconnected machine logic circuits or circuit modules within the computing system. The implementation is a matter of choice dependent on the performance requirements of the computing system implementing the invention. In light of this disclosure, it will be recognized by one skilled in the art that the functions and operation of the various embodiments disclosed may be implemented in software, in firmware, in special purpose digital logic, and any combination thereof without deviating from the spirit and scope of the present invention as recited within the claims attached hereto.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for improving memory usage for a computer program, comprising:
   receiving a data access request;
   removing the data access request when it is determined that the data request is unnecessary;
   using information about a data access sequence to determine if the data access request refers to part of a frequently occurring data access sequence; and
   if the data access request refers to part of the frequently occurring data access sequence, placing data from the data access request in a memory location.

2. The method of claim 1, wherein the memory location comprises a location in a cache memory.

3. The method of claim 2, wherein placing the data from the data access further comprises:
   selecting a cache memory address such that a cache conflict with other data accesses of the frequently occurring data access sequence is avoided; and
   placing the data in the selected cache memory address.

4. The method of claim 1, wherein the placing of the data from the data access request in memory further comprises collocating the data from the data access with other data in memory from the frequently occurring data sequence.

5. A computer-implemented method for improving memory usage for a computer program, comprising:

generating a plurality of data access requests from an executing computer program;

analyzing the plurality of the data access requests for data access requests that are unnecessary;

removing at least a portion of the unnecessary data requests;

determining when one of the data access requests refers to part of a frequently occurring data access sequence; and when the data access request refers to part of the frequently occurring data access sequence, placing data from the data access request in a memory location.

6. The method of claim 5, wherein the memory location comprises a location in a cache memory.

7. The method of claim 6, wherein placing the data from the data access further comprises:

selecting a cache memory address such that a cache conflict with other data accesses of the frequently occurring data access sequence is avoided; and placing the data in the selected cache memory address.

8. The method of claim 5, wherein the placing of the data from the data access request in memory further comprises collocating the data from the data access with other data in memory from the frequently occurring data access sequence.

9. The method of claim 7, wherein analyzing the plurality of the data access requests for data access requests that are unnecessary comprises analyzing the data access requests for stack references.

10. The method of claim 7, wherein analyzing the plurality of the data access requests for data access requests that are unnecessary comprises analyzing the data access requests for heap references.

11. A computer-readable medium having computer-executable instruction for improving memory usage for a computer program, comprising:

receiving a data access request;

determining whether to remove the data access request when the data request is unnecessary before the element is placed in a memory location;

using information about a data access sequence to determine if the data access request refers to an element of a frequently requested data access sequence.

12. The computer-readable medium of claim 11, further comprising if the data access request is a request for an element of a frequently requested data access sequence:

(a) retrieving the element; and (b) placing the element in a memory location.

13. The computer-readable medium of claim 12, wherein the memory comprises cache memory.

14. The computer-readable medium of claim 13, wherein placing the element in the cache memory comprises storing the element in cache memory such that a cache conflict with a second element in the frequently requested data access sequence is avoided.

15. The computer-readable medium of claim 12, wherein the memory comprises a RAM.

16. The computer-readable medium of claim 15, wherein placing the element in the RAM comprises collocating the element in the RAM with a second element of the frequently requested data access sequence.

* * * * *